United States Patent
Kim et al.

(10) Patent No.: US 9,853,792 B2
(45) Date of Patent: *Dec. 26, 2017

(54) METHOD AND APPARATUS FOR TRANSMITTING AND RECEIVING FEEDBACK ON CHANNEL STATE INFORMATION

(71) Applicant: LG ELECTRONICS INC., Seoul (KR)

(72) Inventors: Soyeon Kim, Anyang (KR); Jaehoon Chung, Anyang (KR); Seunghee Han, Anyang (KR)

(73) Assignee: LG ELECTRONICS INC., Seoul (KR)

(*) Notice: Subject to any disclaimer, the term of this patent is extended or adjusted under 35 U.S.C. 154(b) by 69 days.

This patent is subject to a terminal disclaimer.

(21) Appl. No.: 15/015,974

(22) Filed: Feb. 4, 2016

(65) Prior Publication Data

US 2016/0156447 A1   Jun. 2, 2016

Related U.S. Application Data

(63) Continuation of application No. 14/521,207, filed on Oct. 22, 2014, now Pat. No. 9,276,725, which is a
(Continued)

(51) Int. Cl.
*H04W 4/00* (2009.01)
*H04L 5/00* (2006.01)
(Continued)

(52) U.S. Cl.
CPC ......... *H04L 5/0053* (2013.01); *H04B 7/0626* (2013.01); *H04L 1/0027* (2013.01);
(Continued)

(58) Field of Classification Search
CPC ............. H04W 72/0413; H04L 5/0057; H04L 1/0027; H04L 5/006
(Continued)

(56) References Cited

U.S. PATENT DOCUMENTS 8,891,477 B2\* 11/2014 Kim ..................... H04L 5/001
  370/329
2005/0232156 A1   10/2005 Kim et al.
(Continued)

FOREIGN PATENT DOCUMENTS

CN          1684457 A     10/2005
KR  10-2009-0082851 A      7/2009
(Continued)

OTHER PUBLICATIONS

Motorola Mobility, "Periodic CQI/PMI/RI reporting for CA," 3GPP TSG RAN WG1 #63bis, R1-110296, Jan. 17, 2011-Jan. 21, 2011, Dublin Ireland, pp. 1-4, XP050490373.
(Continued)

*Primary Examiner* — Chi H Pham
*Assistant Examiner* — Alexander O Boakye
(74) *Attorney, Agent, or Firm* — Birch, Stewart, Kolasch & Birch, LLP

(57) ABSTRACT

A method of receiving a channel state information (CSI) report by a base station in a wireless communication system; the BS station (BS) therefore; a method of transmitting a CSI report by a user equipment (UE) in a wireless communication system; and the UE therefore are discussed. The method of receiving a CSI report according to one embodiment includes transmitting, via radio resource control (RRC) signaling, information for configuring at least one secondary cell (SCell) in addition to a primary cell (PCell) and a plurality of periodic CSI feedback configurations for a plurality of serving cells; and receiving, via a subframe of
(Continued)

the PCell, a CSI report for only one of the plurality of serving cells. When CSI reports of two or more serving cells collide, CSI reports are dropped. When CSI reports of different serving cells having a same priority collide, CSI reports are dropped.

20 Claims, 11 Drawing Sheets

Related U.S. Application Data continuation of application No. 13/811,553, filed as application No. PCT/KR2011/003408 on May 6, 2011, now Pat. No. 8,891,477.

(60) Provisional application No. 61/366,164, filed on Jul. 21, 2010.

(51) Int. Cl.
| | |
|---|---|
| *H04W 72/04* | (2009.01) |
| *H04B 7/06* | (2006.01) |
| *H04W 72/10* | (2009.01) |
| *H04L 1/00* | (2006.01) |
| *H04W 88/02* | (2009.01) |

(52) U.S. Cl.
CPC .............. *H04L 5/001* (2013.01); *H04L 5/006* (2013.01); *H04L 5/0032* (2013.01); *H04L 5/0057* (2013.01); *H04W 72/0413* (2013.01); *H04W 72/10* (2013.01); *H04B 7/0639* (2013.01); *H04L 1/0026* (2013.01); *H04W 88/02* (2013.01)

(58) Field of Classification Search
USPC ........................................................ 370/329
See application file for complete search history.

(56) References Cited

U.S. PATENT DOCUMENTS

| | | | |
|---|---|---|---|
| 2010/0296472 A1 | 11/2010 | Lee et al. | |
| 2011/0128883 A1 | 6/2011 | Chung et al. | |
| 2011/0317657 A1* | 12/2011 | Chmiel .................. | H04L 5/001 370/331 |
| 2013/0258954 A1 | 10/2013 | Khoshnevis et al. | |

FOREIGN PATENT DOCUMENTS

| | | |
|---|---|---|
| WO | WO 2009/096698 A2 | 8/2009 |
| WO | WO 2010/013962 A2 | 2/2010 |
| WO | WO 2012/077480 A1 | 6/2012 |

OTHER PUBLICATIONS

Nokia Siemens Networks, "On CSI Feedback Signalling in LTE-Advanced Uplink," 3GPP TSG RAN WG1 Meeting #56bis, R1-091353, Agenda Item 15.2, Mar. 23-27, 2009, Seoul, Republic of Korea, 4 pages.

Panasonic, "Periodic CQI Reporting for Carrier Aggregation," 3GPP TSG-RAN WG1 Meeting 61bis, R1-103749, Jun. 28-Jul. 2, 2010, Dresden Germany, pp. 1-4, XP050449179.

* cited by examiner (a)

(b)

(a)

(b)

METHOD AND APPARATUS FOR TRANSMITTING AND RECEIVING FEEDBACK ON CHANNEL STATE INFORMATION

CROSS-REFERENCE TO RELATED APPLICATIONS

This application is a Continuation of copending application Ser. No. 14/521,207, filed on Oct. 22, 2014, which is a Continuation of application Ser. No. 13/811,553 (which has been granted as U.S. Pat. No. 8,891,477), filed on Jan. 22, 2013, which was the National Stage Application of PCT International Application No. PCT/KR2011/003408 on May 6, 2011, which claims the benefit under 35 U.S.C. §119(e) to U.S. Provisional Application No. 61/366,164, filed on Jul. 21, 2010, all of which are hereby expressly incorporated by reference into the present application.

BACKGROUND OF THE INVENTION

1. Field of the Invention

The present invention relates to a wireless communication, and more particularly, to a method and apparatus for transmitting/receiving a channel state information feedback in a wireless communication system supportive of a plurality of component carriers.

2. Background Art

For one example of a mobile communication system to which the contents proposed by the present specification are applicable, 3GPP LTE ($3^{rd}$ generation partnership project long term evolution: hereinafter abbreviated LTE) communication system and LTE-Advanced (hereinafter abbreviated LTE-A) communication system are schematically described as follows.

At least one or more cells exist in a single base station (or eNode B). The cell sets a single carrier to one of bandwidths including 1.25 MHz, 2.5 MHz, 5 MHz, 10 MHz, 15 MHz, 20 MHz and the like and then provides DL/UL (downlink/uplink) service to a plurality of user equipments. In doing so, different cells may be configured to provide different bandwidths, respectively. A base station (or eNode B) transmits downlink (DL) scheduling information for downlink (DL) data to inform a corresponding user equipment of time/frequency region for transmitting data, coding, data size, HARQ (hybrid automatic repeat and request) related information and the like. The base station also transmits UL scheduling information for uplink (UL) data to the corresponding user equipment to indicate time/frequency region available for the corresponding user equipment, coding, data size, HARQ related information and the like. Moreover, an interface for user or control traffic transmission may be usable between base stations (or eNode Bs).

Wireless communication technology has been developed up to LTE based on WCDMA (wideband code division multiple access). Yet, the demand and expectation of users and service providers has increased persistently. Moreover since many ongoing efforts are made to research and develop other radio access technologies, the demand for new technology evolution is increasing to have competitive power in the future. In particular, cost reduction per bit, service availability expansion, flexible frequency band use, simple-structured open interface, reasonable power consumption of user equipment and the like are required.

Recently, ongoing standardization of the next technology of LTE is performed by 3GPP. Such technology shall be named LTE-A in the present specification. Big differences between LTE system and LTE-A system may include a system bandwidth difference and an adoption of a relay node.

The goal of LTE-A system is to support maximum 100 MZ wideband. To this end, LTE-A system uses carrier aggregation or bandwidth aggregation to achieve the wideband using a plurality of frequency blocks. According to the carrier aggregation, a plurality of frequency blocks are used as one wide logical frequency band to use wider frequency band. And, a bandwidth of each of the frequency blocks may be defined based on a bandwidth of a system block used by LTE system. And, each of the frequency blocks is transmitted using a component carrier.

As the LTE-A system of the next generation communication system adopts the carrier aggregation technology, a user equipment is able to receive a signal from a base station or relay node of a system supportive of a plurality of carriers.

However, in case of attempting to transmit/receive data efficiently by adapting to a change of a wireless environment in a system supportive of a plurality of carriers, it may be necessary to monitor a state of each of a plurality of the carriers frequently. Therefore, the demand for a method of transmitting/receiving a channel state information on each carrier, i.e., a method of effectively transmitting a feedback on each channel state in a manner fit for a limited frame is rising.

SUMMARY OF THE INVENTION

In a carrier aggregation system, collision may occur while a user equipment feeds back channel state information on each of a plurality of downlink component carriers. In particular, a situation that a user equipment should feed back channel state information on a plurality of carriers in the same subframe in accordance with a configuration of the feedback method may occur.

One object of the present invention is to provide a method of effectively feeding back channel state information in the above situation.

Another object of the present invention is to provide a base station and user equipment capable of performing the above method.

To achieve these and other advantages and in accordance with the purpose of the present invention, as embodied and broadly described, a method of operating a user equipment for a channel state information (CSI) feedback in a carrier aggregation system according to one embodiment of the present invention may include the steps of receiving a channel state information (CSI) feedback configuration information on each of a plurality of downlink (DL) component carriers from a base station and feeding back a channel state information to the base station via a physical uplink control channel (PUCCH) of a primary component carrier based on the received channel state information configuration information, wherein the channel state information configuration information is received via a prescribed one of a plurality of the downlink component carriers or each of a plurality of the downlink component carriers.

Preferably, the prescribed one of the component carrier may include a primary component carrier.

Preferably, the channel state information may include one of CQI (channel quality information), PMI (precoding matrix indicator) and RI (rank indicator).

More preferably, the method may further include the step of receiving a priority information configured in accordance with the channel state information or the downlink component carrier from the base station.

In this case, the method may further include the step of if the channel state information on each of a plurality of the downlink component carriers needs to be simultaneously fed back to the base station, determining one channel state information to feed back to the base station based on the received priority information.

And, the step of determining the one channel state information may include the step of dropping the channels informations on the downlink component carriers except the channel state information on the downlink component carrier having a top priority.

Preferably, the channel state information and the priority information may be transmitted by RRC signaling.

More preferably, the priority information may be configured in a manner of being linked with a QoS (quality of service) set for each of the downlink component carriers.

More preferably, the priority information may be configured in accordance with a count of dropping the channel state information feedback.

More preferably, the priority information nay indicate that a priority of a wideband channel state information feedback is set higher than that of a subband channel state information feedback.

More preferably, the priority information may be set high for the downlink component carrier having a short or long transmission period of the channel state information feedback.

More preferably, the priority information may indicate that a priority of the channel state information feedback for a self-scheduling component carrier is set higher than that of the channel state information feedback for a cross-scheduling component carrier.

More preferably, the priority information may indicate that a priority of the channel state information feedback for a cross-scheduling component carrier is set higher than that of the channel state information feedback for a self-scheduling component carrier.

More preferably, the channel state information configuration information may include an index information indicating the downlink component carrier matching the channel state information configuration information. To further achieve these and other advantages and in accordance with the purpose of the present invention, a user equipment for feeding back a channel state information (CSI) in a carrier aggregation system according to another embodiment of the present invention may include a wireless communication unit configured to externally transmit/receive a wireless signal and a control unit connected to the wireless communication unit, the control unit controlling the wireless communication unit to receive a channel state information (CSI) feedback configuration information on each of a plurality of downlink (DL) component carriers from a base station, the controller controlling the wireless communication unit to feed back the channel state information to the base station via a physical uplink control channel (PUCCH) of a primary component carrier based on the received channel state information configuration information, wherein the channel state information configuration information is received via a prescribed one of a plurality of the downlink component carriers or each of a plurality of the downlink component carriers.

Preferably, the prescribed one of the component carrier may include a primary component carrier.

Preferably, the channel state information may include one of CQI (channel quality information), PMI (precoding matrix indicator) and RI (rank indicator).

More preferably, the control unit may control the wireless communication unit to receive a priority information configured in accordance with the channel state information or the downlink component carrier from the base station.

More preferably, if the channel state information on each of a plurality of the downlink component carriers needs to be simultaneously fed back to the base station, the control unit may determine one channel state information to feed back to the base station based on the received priority information.

In this case, the control unit may determine the one channel state information by dropping the channels informations on the downlink component carriers except the channel state information on the downlink component carrier having a top priority.

According to the present invention, in a carrier aggregation system, a base station provides a priority of a CSI feedback and a user equipment transmits the CSI feedback by the priority, thereby component carriers can be effectively monitored.

DETAILED DESCRIPTION OF THE INVENTION

Figure 1:
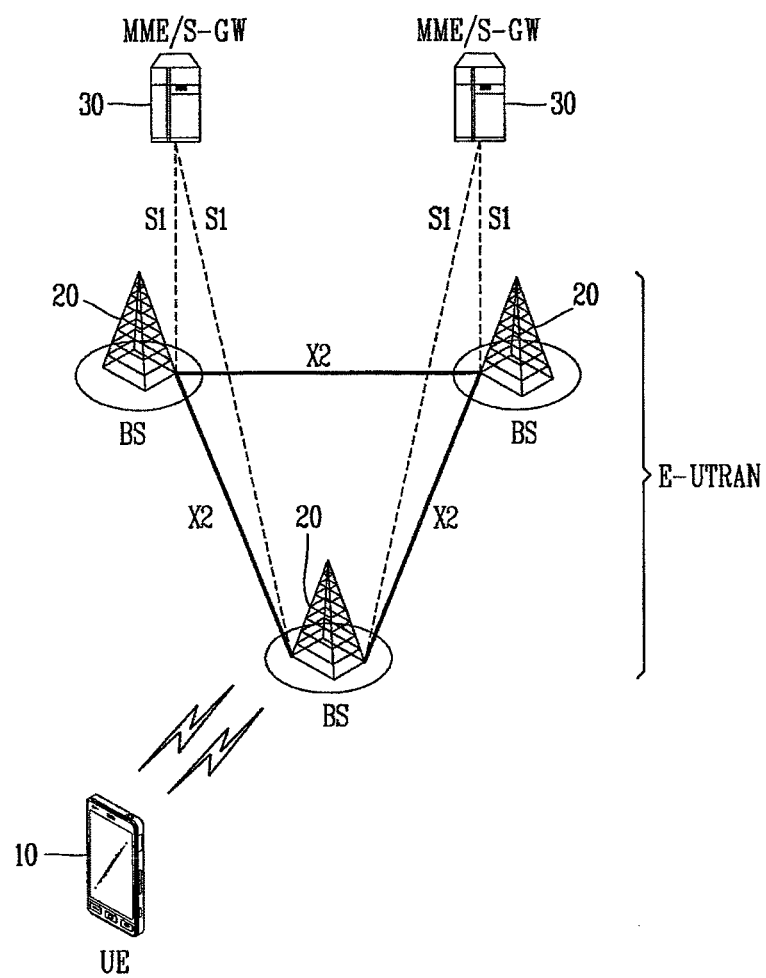
FIG. 1 is a block diagram of a wireless communication system.

The embodiments of the present invention apply to a case that a mobile communication system includes 3GPP LTE system or LTE-A system.

Yet, the present invention may be non-limited by the above cases and also apply to every communication system and method to which the technical idea of the present invention is applicable. Moreover, the present invention may be applicable to other systems.

The technical terminologies used in the present specification are used to describe specific embodiment(s) only and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

The singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Suffixes 'module' and 'unit' for a component used in the present specification are given or used interchangeably in consideration of facilitation in preparing the specification only but do not have meanings or roles different from each other.

Terminologies, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

Reference will now be made in detail to the preferred embodiments of the present invention, examples of which are illustrated in the accompanying drawings. Wherever possible, the same reference numbers will be used throughout the drawings to refer to the same or like parts and their redundant descriptions shall be omitted.

Moreover, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Terminals are shown in the accompanying drawings. A terminal may be called a user equipment (UE), a mobile equipment (ME), a mobile station (MS), a user terminal (UT), a subscriber station (SS), a wireless device, a handheld device, an access terminal (AT) or the like. The terminal may include such a communication function equipped portable device as a mobile phone, a PDA, a smart phone, a wireless modem, a notebook computer and the like. Yet, the terminal may include such a non-portable device as a desktop PC, a vehicle loaded device and the like. Assume that a base station is a general name of such a random node of a network stage communicating with a terminal as a Node B, an eNode B, a BS, a access point (AP) and the like. A relay device may be called a relay node (RN), a relay station (RS), a relay or the like.

A user equipment or a relay node in a mobile communication system may be able to receive information in downlink (hereinafter abbreviated DL) from a base station. The user equipment or relay node may be able to transmit information in uplink (hereinafter abbreviated UL) as well. Informations transmitted or received by the relay node may include data and various kinds of control informations. And, various physical channels exist in response to types and usages of the informations transmitted or received by the relay node.

FIG. 1 is a conceptional diagram of a wireless communication system.

FIG. 1 shows a network structure of E-UMTS (evolved-universal mobile telecommunications system). The E-UMTS may be called LTE (long term evolution) or LTE-A system. A wireless communication system is broadly deployed to provide various communication services of voice, packet data and the like.

Referring to FIG. 1, a E-UTRAN (evolved-UMTS terrestrial radio access network) includes a base station (BS) 20 that provides a control plane and a user plane.

A user equipment (UE) 10 may be fixed or have mobility. The user equipment 10 may be called such a different terminology as a mobile station (MS), a user terminal (UT), a subscriber station (SS), a wireless device and the like.

The base station 20 generally includes a fixed station communicating with the user equipment 10 and may be called such a terminology as an evolved-Node B, a base transceiver system (BTS), an access point and the like. At least one cell may exist in one base station 20. And, an interface for user or control traffic transmission may be used between the base stations 20.

In the following description, a DL (downlink) may mean a communication from the base station 20 to the user equipment 10 and a UL (uplink) may mean a communication from the user equipment 10 to the base station 20.

The base station 20 may be connected to each other via X2 interface. The base station 20 is connected to an evolved packet core (EPC) via S1 interface, and more particularly to MME/S-GW (mobility management entity/serving gateway) 30. The S1 interface supports many-to-may relation between the base station 20 and the MME/SAE gateway 30.

Figure 2:
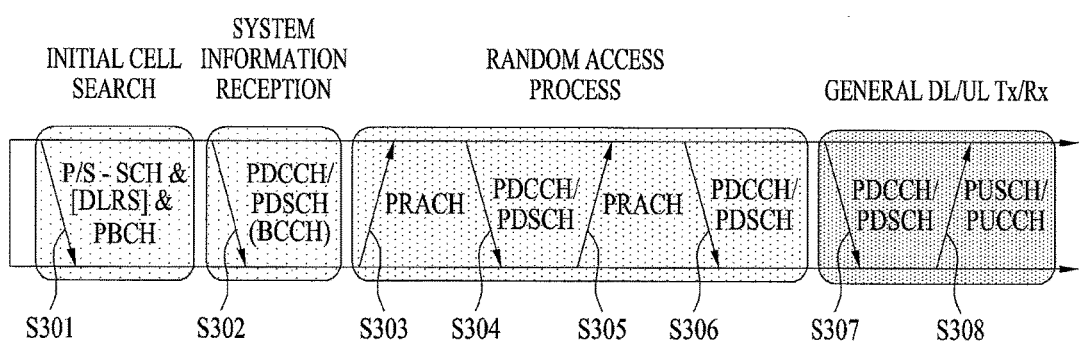
FIG. 2 is a diagram to describe physical channels used by 3GPP system and a general signal transmitting method using the physical channels.

FIG. 2 is a diagram to describe physical channels used by 3GPP system and a general signal transmitting method using the physical channels.

Referring to FIG. 2, a user equipment performs an initial cell search such as synchronizing with a base station and the like when it newly enters a cell or the power is turned on again (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment receives a downlink reference signal (DL RS) in the initial cell search step and is then able to check a DL channel state.

Having finished the initial cell search, the user equipment can acquire more detailed system information by receiving a physical downlink control channel (PDSCH) in accordance with a physical downlink control channel (PDCCH) and information carried on the PDCCH (S302).

Meanwhile, if the user equipment initially accesses the base station or there is no radio resource for signal transmission, the user equipment performs a random access procedure (RACH) on the base station (S303 to S306). To this end, the user equipment transmits a specific sequence as a preamble through a physical random access channel (PRACH) (S303, S305), and receives a response message to the random access through the PDCCH and a PDSCH corresponding to the PDCCH (S304, S306). In case of a contention based RACH, such a contention resolution procedure can be performed additionally.

Having performed the above-described procedure, the user equipment is able to such a general UL/DL signal transmitting procedure as a PDCCH/PDSCH reception (S307) and a PUSCH/PUCCH (physical uplink shared channel/physical uplink control channel) transmission (S308). The information, which is transmitted from the user equipment to the base station in UL or received from the base station to the user equipment includes a downlink/uplink ACK/NACK signal, a channel quality indicator (hereinafter abbreviated CQI), a precoding matrix index (hereinafter abbreviated PMI), a rank indicator (hereinafter abbreviated RI) and the like. In case of the 3GPP LTE system, the user equipment may be able to transmit the above-mentioned information such as CQI, PMI, RI and the like via PUSCH and/or the PUCCH.

Figure 3:
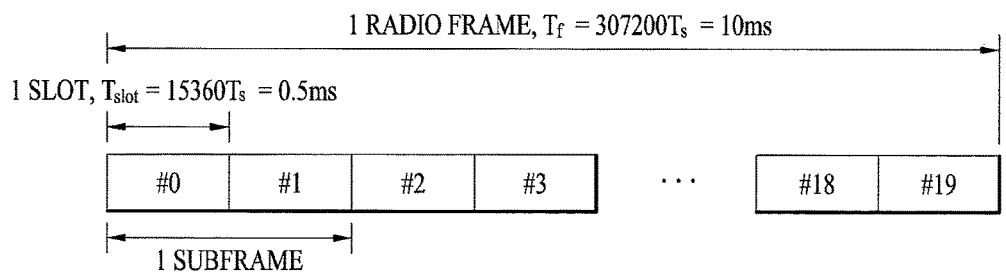
FIG. 3 is a diagram for one example of a structure of a radio frame used in 3GPP LTE system as one example of a mobile communication system.

FIG. 3 is a diagram for one example of a structure of a radio frame used in 3GPP LTE system as one example of a mobile communication system.

Referring to FIG. 3, one radio frame has a length of 10 ms ($327{,}200 \cdot T_s$) and is constructed with 10 subframes in equal size. Each of the subframes has a length of 1 ms and is constructed with two slots. Each of the slots has a length of 0.5 ms ($15{,}360 \cdot T_s$). In this case, $T_s$ indicates a sampling time and is expressed as $T_s = 1/(15 \text{ kHz} \times 2{,}048) = 3.2552 \times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier-frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

Figure 4A:
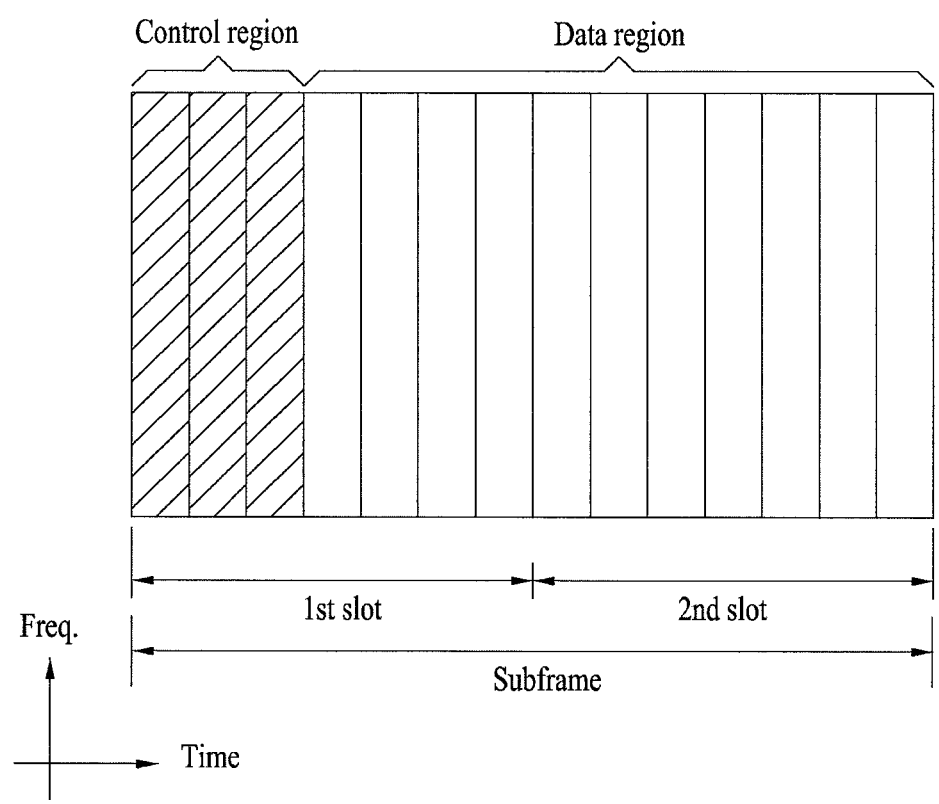
FIGS. 4A and 4B are diagrams for structures of downlink and uplink subframes in 3GPP LTE system as one example of a mobile communication system.
Figure 4B:
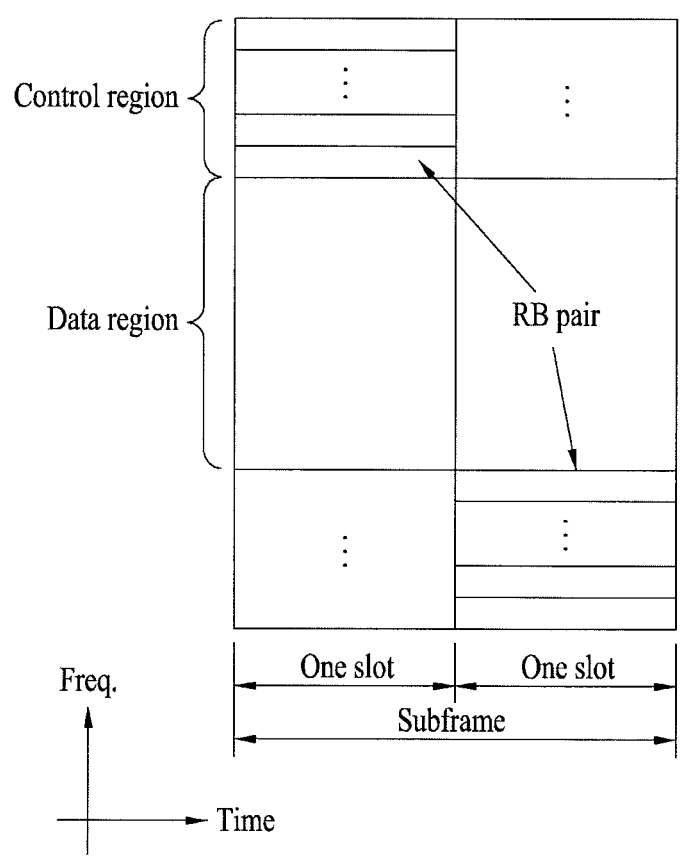

FIGS. 4A and 4B are diagrams for structures of downlink and uplink subframe in 3GPP LTE system as one example of a mobile communication system.

Referring to FIG. 4A, one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data region for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH may be called downlink control information (hereinafter abbreviated DCI). The DCI indicates a UL resource allocation information, a DL resource allocation information, a UL transmit power control command for random user equipment groups and the like. The PHICH carries ACK/NACK (acknowledgement/not-acknowledgement) signal for UL HARQ (hybrid automatic repeat request). In particular, the ACK/NACK signal for UL data transmitted by a user equipment is carried on PHICH.

Referring to FIG. 4B, a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair assigned to the PUCCH on a slot boundary.

In the following description, a multi-carrier system is explained.

First of all, 3GPP LTE system supports a case that a DL bandwidth and a UL bandwidth are set to differ from each other, which premise a single component carrier (hereinafter abbreviated CC).

This means that 3GPP LTE only supports a case that a DL bandwidth and a UL bandwidth are equal to or different from each other in a situation that a single CC is defined for each of DL and UL. For instance, 3GPP LTE system supports maximum 20 MHz and also supports a single CC for each of DL and UL only despite that a UL bandwidth and a DL bandwidth may differ from each other.

Carrier aggregation, which is called bandwidth aggregation or spectrum aggregation, supports a plurality of CCs. The carrier aggregation supports an increasing throughput, prevents a cost increase due to the introduction of broadband RF (radio frequency) devices, and secures compatibility with a legacy system. For instance, if 5 CCs are assigned as granularity by carrier unit having a bandwidth of 20 MHz, the carrier aggregation is able to support maximum 100 MHz bandwidth.

The carrier aggregation can be categorized into contiguous carrier aggregation for performing aggregation among contiguous carriers in frequency domain and non-contiguous carrier aggregation for performing aggregation among non-contiguous carriers. The number of the aggregated CCs in DL may be set different from that in UL. If the DL CC number is equal to the UL CC number, it may be called symmetric aggregation. If the DL CC number is different from the UL CC number, it may be called asymmetric aggregation.

Moreover, a component carrier may be called a cell.

The cell may mean a combination of DL resources with selective UL resources. The linkage between a carrier frequency of DL resources and a carrier frequency of UL resources can be obtained from system information transmitted on the DL resources.

In particular, the cell means a pair of DL CC (downlink component carrier) and UL CC (uplink component carrier) or may mean a DL CC (downlink component carrier) only. In this case, the UL CC means a CC that establishes a linkage with the DL CC.

In more particular, the cell is used as a concept of a pair of DL CC and UL CC or as a terminology indicating DL CC.

Meanwhile, the aforementioned cell should be discriminated from a generally used 'cell' corresponding to an area covered by a base station. In the following description, 'cell' and 'component carrier (CC)' can be interchangeably usable. In this case, the representation of 'cell' means the component carrier (CC) mentioned in the above description.

CCs may differ from each other in size (i.e., bandwidth). For instance, assuming that 5 CCs are used for configuration of 70-MHz band, the corresponding band can be configured with '5-MHz carrier (CC #0)+20-MHz carrier (CC #1)+20-MHz carrier (CC #2)+20-MHz carrier (CC #3)+5-MHz carrier (CC #4)'.

Figure 5:
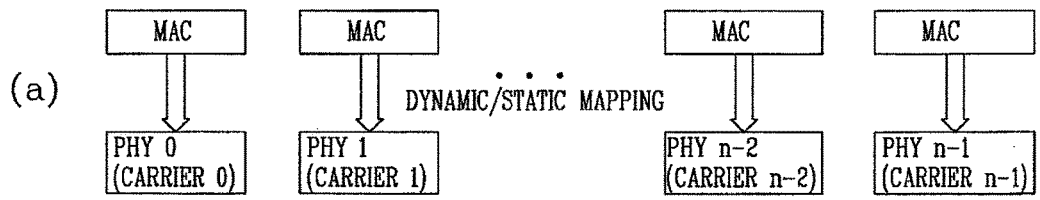
FIG. 5 shows a diagram where (a) is a diagram to describe a concept for a plurality of MACs to manage multiple carriers in a base station and (b) is a diagram to describe a concept for a plurality of MACs to manage multiple carriers in a user equipment.
Figure 5:
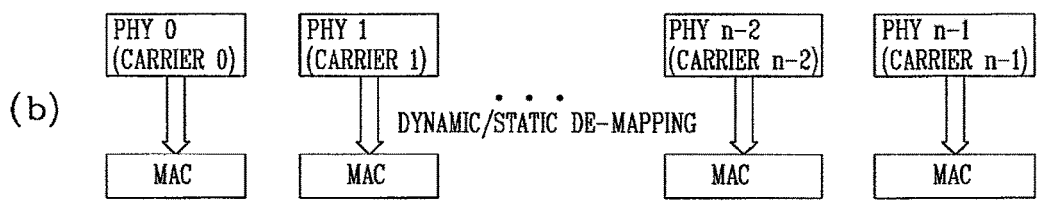
Figure 6:
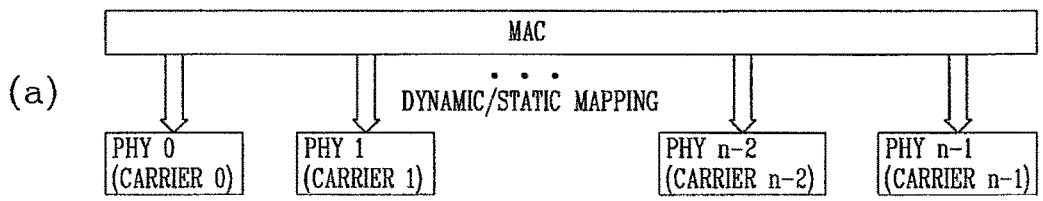
FIG. 6 shows a diagram where (a) is a diagram to describe a concept for one MAC to manage multiple carriers in a base station and (b) is a diagram to describe a concept for one MAC to manage multiple carriers in a user equipment.
Figure 6:
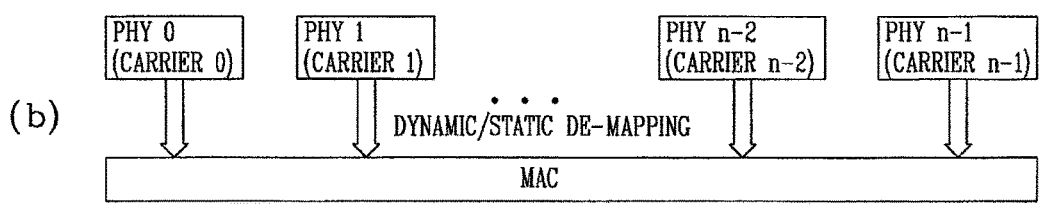

Configurations of physical layer (PHY) and layer 2 (MAC) for transmission on a plurality of UL or DL carrier bands assigned in aspect of a random cell or user equipment may be represented as FIG. 5 or FIG. 6.

FIG. 5 (*a*) is a diagram to describe a concept for a plurality of MACs to manage multiple carriers in a base station and FIG. 5 (*b*) is a diagram to describe a concept for a plurality of MACs to manage multiple carriers in a user equipment.

Referring to FIG. 5 (*a*) and FIG. 5 (*b*), MAC may be able to control each carrier by 1:1. In a system supportive of a plurality of carriers, each of the carriers may be available contiguously or non-contiguously. This may be applicable to UL/DL irrespectively. TDD system is configured to manage and operate N carriers each of which includes DL and UL transmissions, while FDD system is configured to manage and operate multiple carriers for each of UL and DL. In case of the FDD system, an asymmetric carrier aggregation, which differs in the number of carriers aggregated in UL/DL and/or a bandwidth of carrier therein, can be supported.

FIG. 6 (*a*) is a diagram to describe a concept for one MAC to manage multiple carriers in a base station and FIG. 6 (*b*) is a diagram to describe a concept for one MAC to manage multiple carriers in a user equipment.

Referring to FIG. 6 (*a*) and FIG. 6 (*b*), one MAC performs transmission and reception by managing and operating at least one or more frequency carriers. Since the frequency carriers managed by one MAC need not be contiguous with each other, it is advantageous in that resource management can be performed more flexibly. In FIG. 6 (*a*) or FIG. 6 (*b*), one PHY may mean one component carrier for clarity. In this case, it is not mandatory for one PHY to mean an independent RF (radio frequency) device. Generally, one independent RF device means one PHY. Alternatively, one RF device may include one or more PHYs.

A series of physical downlink control channels (PDCCHs), which carry control informations of L1/L2 control signaling generated from a packet scheduler of MAC layer to support the configuration shown in FIG. 6 (*a*) or FIG. 6 (*b*), may be transmitted in a manner of being mapped to physical resource within a separate component carrier.

In doing so, PDCCH for channel assignment or grant related control information on PDSCH or PUSCH (physical uplink shared channel) unique to an individual user equipment is encoded per CC, which carries a corresponding physical shared channel, and then generated as separate PDCCH. This is represented as separate coded PDCCH. Alternatively, control informations for physical shared channel transmission of several component carriers may be transmitted in a manner of being configured into one PDCCH, which is represented as joint coded PDCCH.

A base station may have configured a connection to transmit PDCCH and/or PDSCH for performing control information and data transmissions suitable for a situation unique to a specific user equipment or relay node in order to support UL or DL carrier aggregation or may be able to assign component carriers that become objects of measurement and/or reporting as a preparation process for performing the configuration of the connection for the PDCCH and/or PDSCH transmission. This is represented as component carrier assignment in accordance with a random purpose.

In doing so, if the component carrier assignment information is controlled by L3 RRM (radio resource management), the base station may be able to transmit the control information by RRC signaling (e.g., UE-specific RRC signaling, RN-specific RRC signaling, etc.) unique to a series of UEs or RN in accordance with dynamics of a control. Alternatively, the base station may be able to transmit the control information by L1/L2 control signaling on a series of PDCCHs or a series of dedicated physical control channels for the present control information only.

Figure 7:
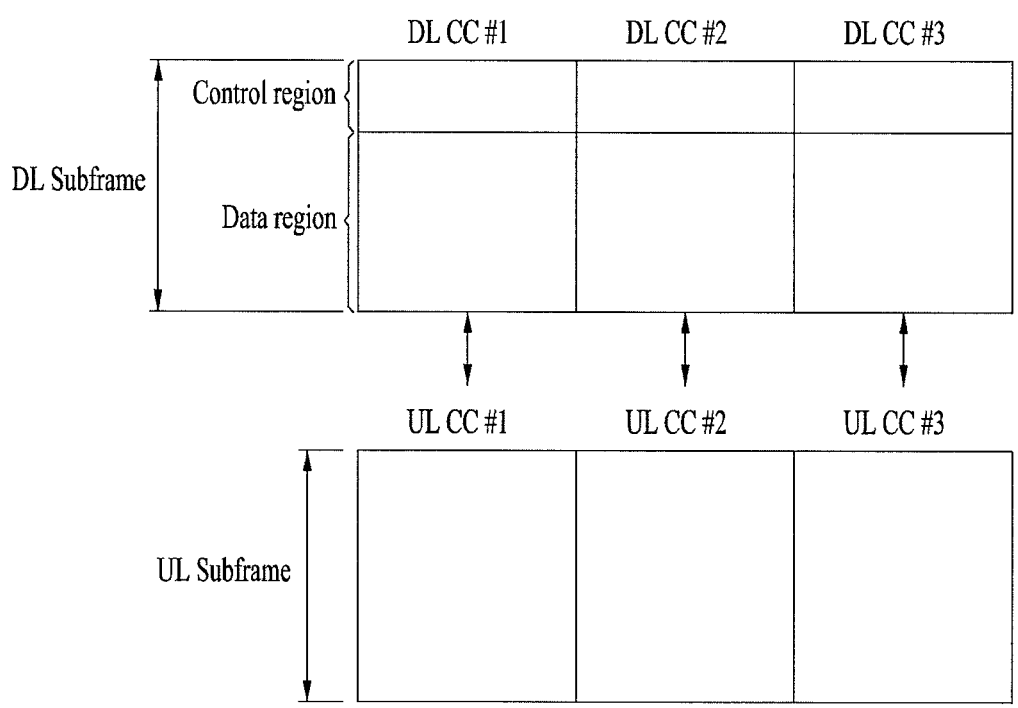
FIG. 7 is a diagram for one example of multiple carriers.

FIG. 7 shows one example of multiple carriers.

Referring to FIG. 7, there are 3 DL CCs and 3 UL CCs, by which the number of DL CCs and the number of UL CCs are non-limited. PDCCH and PDSCH are independently transmitted on the respective DL CCs. PUCCH and PUSCH are independently transmitted on the respective UL CCs.

In the following description, as mentioned in the foregoing description, a multiple carrier (multi-carrier) system means the system supportive of multiple carriers based on carrier aggregation.

In a multi-carrier system, contiguous carrier aggregation and/or non-contiguous carrier aggregation may be usable. And, any one of symmetric aggregation and asymmetric aggregation is usable as well.

In a multi-carrier system, a linkage between DL CC and UL CC may be defined. The linkage may be established using EARFCN information contained in DL system information and is configured using a fixed DL/UL Tx/Rx separation relation. The linkage means a mapping relation between DL CC, on which PDCCH carrying a UL grant is carried, and UL CC that uses the UL grant.

The linkage may mean a mapping relation between DL CC (or UL CC) for transmitting data for HARQ and UL CC (or DL CC) for transmitting HARQ ACK/NACK signal. Linkage information is a part of a higher layer message such as an RRC message or a part of system information. And, a base station is able to inform a user equipment of the linkage information. The linkage between the DL CC and the UL CC may be fixed. Yet, the linkage between the DL CC and the UL CC may be changeable between cells/user equipments.

Separate coded PDCCH means that control information such as resource allocation for PDSCH/PUSCH on a single carrier can be delivered by the PDCCH. In particular, PDCCH and PDSCH correspond to each other by 1:1 and PDCCH and PUSCH correspond to each other by 1:1.

Joint coded PDCCH means that resource allocation for PDSCH/PUSCH of a plurality of CCs can be delivered by a single PDCCH. The single PDCCH may be transmitted on a single CC or a plurality of CCs.

In a multi-carrier system, 2 kinds of methods are available for CC scheduling.

First of all, PDCCH-PDSCH pair is transmitted on a single CC. This CC is called a self-scheduling CC and also means that a UL CC for transmitting PUSCH is the CC linked to a DL CC for transmitting a corresponding PDCCH.

In particular, PDCCH is provided to allocate PDSCH resource to the same CC or allocate PUSCH resource to a linked UL CC.

Secondly, DL CC for transmitting PDSCH or UL CC for transmitting PUSCH is determined irrespective of DL CC for transmitting PDCCH. In particular, PDCCH and PDSCH are transmitted on different DL CCs, respectively or PUSCH is transmitted on UL CC failing to be linked to DL CC for transmitting PDCCH. This is called cross-carrier scheduling.

A CC for transmitting PODCCH may be called a PDCCH carrier, a monitoring CC or a scheduling carrier. And, a CC for transmitting PDSCH/PUSCH may be called a PDSCH/PUSCH carrier or a scheduled carrier.

Cross-carrier scheduling may be activated or deactivated for each user equipment. And, the user equipment, for which the cross-carrier scheduling is activated, is able to receive DCI containing CIF (carrier indicator field). The corresponding user equipment uses the CIF contained in the DCI to find out a received PDCCH relates to a control information on a specifically scheduled CC.

A previously defined DL-UL linkage may be overridden by cross-carrier scheduling. In particular, the cross-carrier scheduling is able to schedule CCs other than the linked CCs irrespective of the DL-UL linkage.

Figure 8:
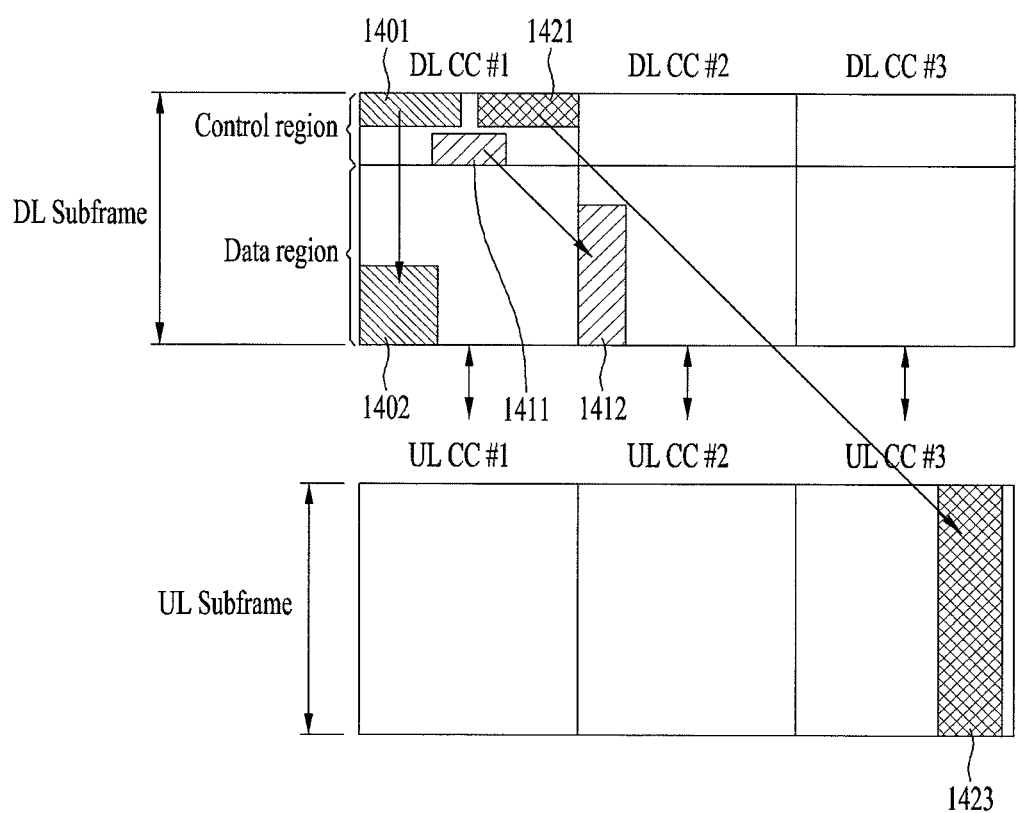
FIG. 8 is a diagram for one example of cross-carrier scheduling.

FIG. 8 is a diagram for one example of cross-carrier scheduling.

Referring to FIG. 8, assume that DL CC #1 and UL CC #1 are linked to each other, that DL CC #2 and UL CC #2 are linked to each other, and that DL CC #3 and UL CC #3 are linked to each other.

A $1^{st}$ PDCCH 1401 of the DL CC #1 carries DCI for a PDSCH 1402 of the same DL CC #1. A $2^{nd}$ PDCCH 1411 of the DL CC #1 carries DCI for a PDSCH 1412 of the DL CC #2. A $3^{rd}$ PDCCH 1421 of the DL CC #1 carries DCI for a PUSCH 1422 of the UL CC #3 that is not linked.

For cross-carrier scheduling, DCI of PDCCH may contain CIF (carrier indicator field). The CIF indicates a DL or UL CC scheduled through the DCI. For instance, the $2^{nd}$ PDCCH 1411 may contain a CIF indicating the DL CC #2. And, the 3rd PDCCH 1421 may contain a CIF indicating the UL CC #3.

Alternatively, the CIF of the $3^{rd}$ PDCCH 1421 may be indicated not by the CIF value corresponding to the UL CC but by the CIF value corresponding to the DL CC.

In particular, the CIF of the $3^{rd}$ PDCCH 1421 indicates the DL CC #3 linked to the UL CC #3, thereby indirectly indicating the UL CC #3 for which PUSCH is scheduled. If the DCI of the PDCCH contains PUSCH scheduling and the CIF indicates the DL CC, a user equipment is able to determine that it is the PUSCH scheduling on the UL CC linked to the DL CC. Through this, it may be able to indicate CCs more than those of a method of indicating all DL/UL CCs using a CIF having a limited bit length (e.g., 3-bit CIF).

A user equipment, which uses cross-carrier scheduling, needs to monitor PDCCH of a plurality of scheduled CCs for the same DCI format within a control region of a single scheduling CC. For instance, if a plurality of DL CCs differ from each other in transmission mode, it may be able to monitor a plurality of PDCCHs for different DCI formats on each of the DL CCs. Despite using the same transmission mode, if a plurality of the DL CCs differ from each other in bandwidth, since a size of a payload of a DCI format is different under the same DCI format, it is able to monitor a plurality of the PDCCHs.

Consequently, when cross-carrier scheduling is possible, it may be necessary for a user equipment to monitor PDCCH for a plurality of DCIs in a control region of a monitoring CC in accordance with a per-CC transmission mode and/or bandwidth. Hence, in order to support this monitoring, a configuration of a search space and a PDCCH monitoring are required.

First of all, in a multi-carrier system, the following terminologies are defined.

UE DL CC set: Set of DL CCs scheduled to enable a user equipment to receive PDSCH UE UL CC set: Set of UL CCs scheduled to enable a user equipment to transmit PUSCH PDCCH monitoring set: Set of at least one DL CC for performing PDCCH monitoring. The PDCCH monitoring set may be equal to the UE DL CC set or may be a subset of the UE DL CC set. The PDCCH monitoring set may include at least one of the DL CCs within the UE DL CC set. Alternatively, the PDCCH monitoring set may be separately defined irrespective of the UE DL CC set. DL CC included in the PDCCH monitoring set may be set to enable self-scheduling for the linked DL CC all the time.

Each of the UE DL CC set, the UE UL CC set and the PDCCH monitoring set may be set cell-specific or UE-specific.

Figure 9:
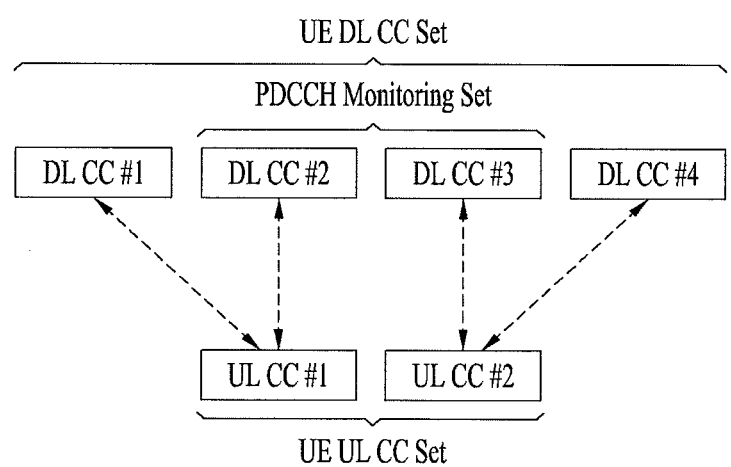
FIG. 9 is a diagram for one example of component carrier (CC) aggregation.

FIG. 9 is a diagram for one example of component carrier (CC) aggregation. Assume that 4 DL CCs (i.e., DL CC #1, DL CC #2, DL CC #3, DL CC #4) are assigned as a UE DL CC set to a user equipment, that 2 UL CCs (i.e., UL CC #1, UL CC #2) are set as a UE UL CC set to the user equipment, and that 2 DL CCs (i.e., DL CC #2, DL CC #3) are assigned as a PDCCH monitoring set to the user equipment.

The DL CC #2 in the PDCCH monitoring set transmits PDCCH for PDSCH of the DL CC #1/#2 in the UE DL CC set and PDCCH for PUSCH of the UL CC #1 in the UE UL CC set. The DL CC #3 in the PDCCH monitoring set transmits PDCCH for PDSCH of the DL CC #3/#4 in the UE DL CC set and PDCCH for PUSCH of the UL CC #2 in the UE UL CC set.

Linkages may be established between the CCs included in the UE DL CC set, the UE UL CC set and the PDCCH monitoring set. In the example shown in FIG. 7, a PDCCH-PDSCH linkage is established between the DL CC #2 of the scheduling CC and the DL CC #1 of the scheduled CC and a PDCCH-PUSCH linkage is established between the DL CC #2 and the UL CC #1. Moreover, a PDCCH-PDSCH linkage is established between the DL CC #3 of the scheduling CC and the DL CC #4 of the scheduled CC and a PDCCH-PUSCH linkage is established between the DL CC #3 and the UL CC #2. And, a base station is able to inform a user equipment of the information on the scheduling CC or the PDCCH-PDSCH/PUSCH linkage information by cell-specific signaling or UE-specific signaling.

Alternatively, DL CC and UL CC may not be linked to each other for each of the DL CCs in the PDCCH monitoring set. After the DL CC in the PDCCH monitoring set and the DL CC in the UE DL CC set have been linked to each other, the UL CC for PUSCH transmission may be limited to the UL CC linked to the DL CC in the UE DL CC set.

CIF may be set different in accordance with the linkage among the UE DL CC set, the UE UL CC set and the PDCCH monitoring set.

In the following description, a channel state information (hereinafter abbreviated CSI) feedback is explained.

First of all, CSI means information indicating a channel state of a transmission link (e.g., downlink), which is collected in a manner of measuring a reference signal. For example, channel state information may include a channel quality indicator (CQI), a precoding matrix indicator (PMI), a rank indicator (RI) and the like. Alternatively, the channel state information may mean the information derived by the CQI/PMI/RI.

In 3GPP LTE system, a user equipment feeds a CSI back to a base station. In doing so, the channel state information may be fed back via various kinds of informations. For instance, the channel state information can be fed back through PMI, CQI. RI and the like. The user equipment performs a channel measurement using a reference signal transmitted by the base station. Based on a result of the channel measurement, the user equipment may then feed the preferred PMI and RI back to the base station. In case that the preferred PMI and RI are used by the base station under a given channel state, they may include PMI and RI determined as providing a highest transmission rate. The CQI may indicate a modulation and coding scheme (MCS) that secures a proper packet error occurrence rate in the PMI and RI fed back by the user equipment. The base station is able to use the channel state information fed back by the user equipment for scheduling.

Figure 10:
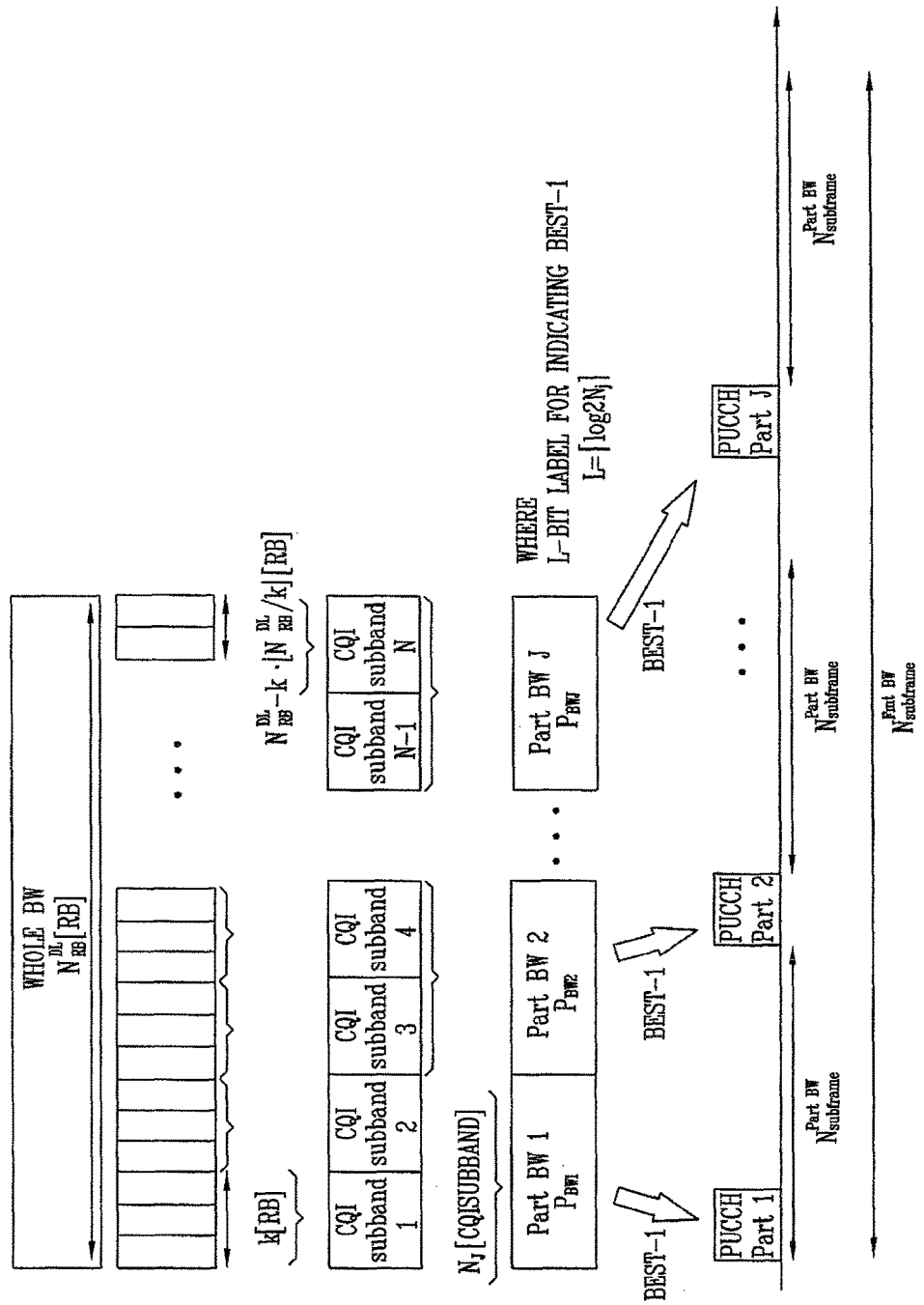
FIG. 10 is a diagram for one example of channel state information feedback.

FIG. 10 is a diagram for one example of channel state information feedback.

Referring to FIG. 10, a user equipment is able to periodically transmit a UE selected subband feedback on PUCCH. In this case, a BP (bandwidth part) is constructed with N_J CQI subbands and 1 CQI subband may be constructed with k RBs. The user equipment selects one subband for each BP and is then able to transmit a feedback for Set S (whole BW) once in a corresponding CSI period.

In a carrier aggregation system, collision may occur while CSIs (CQIs/PMIs/RIs) for several DL CCs are respectively fed back. Assuming that a CSI feedback for each DL CC is independently configured, since PUCCH can be transmitted on a previously designated single UL primary CC (i.e., Primary Cell: PCell} only, it may happen that the corresponding feedback should be performed in the same subframe in aspect of a user equipment in accordance with a configuration of CSI. In this case, an undesired situation may occur in consideration of IMD (intermodulation distortion) and the like.

Figure 11:
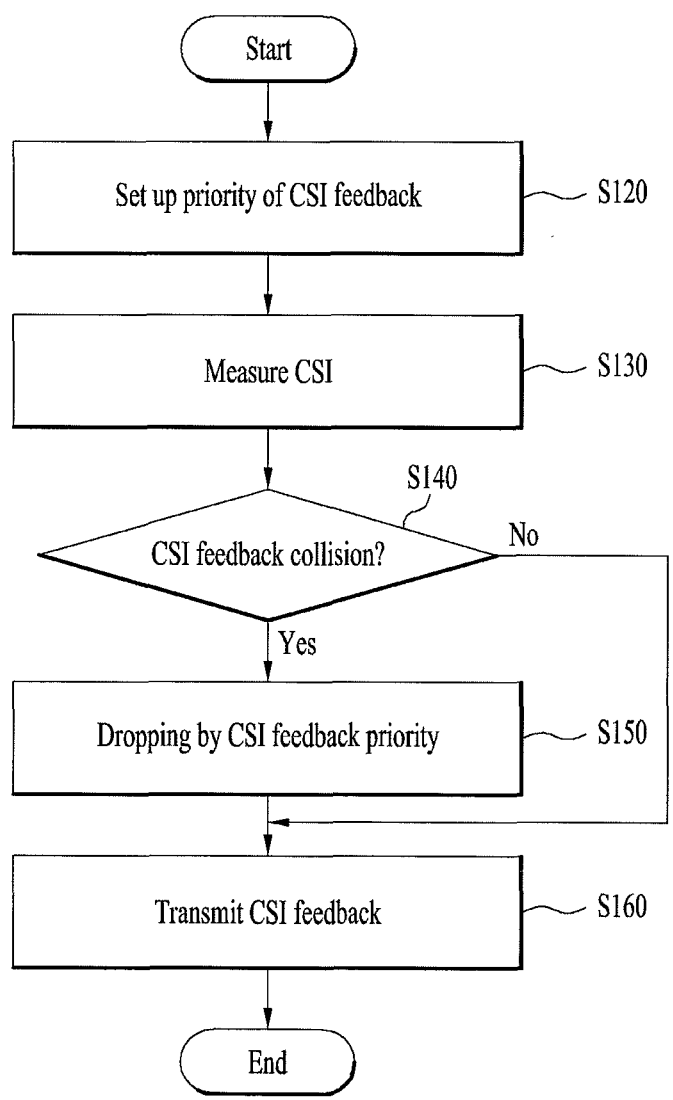
FIG. 11 is a flowchart of a user equipment operating method for CSI feedback in a carrier aggregation system according to one embodiment.

FIG. 11 is a flowchart of a user equipment operating method for CSI feedback in a carrier aggregation system according to one embodiment.

Referring to FIG. 11, for clarity of the following description, a CC may include either Primary CC (PCell) or Secondary CC (Secondary Cell: SCell). Assume that the PCell may be the cell on which a user equipment has performed an initial access. And, assume that the PCell may be the cell reconfigured later through RRC (radio resource control) signaling.

A user equipment may be able to receive CSI feedback reconfiguration information from a base station [S120]. In this case, the CSI feedback configuration information is the information that the user equipment refers to for a CSI feedback. And, the CSI feedback configuration information may include such information as a CC for feeding back a CSI, a structure of a feedback frame and the like, and more particularly, a priority of the CSI feedback.

The CSI feedback configuration information may be received by RRC signaling. And, the user equipment may be able to receive the CSI feedback configuration information together with at least one control information at a timing point of receiving a specific control information.

As mentioned in the above description, since a periodic CSI feedback is transmitted on PUCCH, it is always transmitted on UL PCell irrespective of a carrier aggregation type. In doing so, assume that periodic CSI feedbacks for DL CCs (or DL Cells) are independently configured. And, the signaling may vary depending on whether a periodic CSI feedback configuration information of an independent DL CC is transmitted on a prescribed DL CC (or DL Cell).

According to a $1^{st}$ embodiment of receiving the CSI feedback configuration information, the user equipment may be able to receive the CSI feedback configuration information on each DL CC via the corresponding DL CC (or DL Cell).

If the user equipment already knows such information as a bandwidth of UL PCell and the like, the base station is able to deliver the CSI feedback configuration information by a higher layer signaling of a type provided by 3GPP LTE Rel-8 without separate signaling. And, the user equipment is able to perform a CSI feedback clearly using the corresponding information. The CSI feedback configuration informations on active SCells can be received by the higher layer signaling of each SCell.

According to a $2^{nd}$ embodiment of receiving the CSI feedback configuration information, the user equipment is able to receive the CSI feedback configuration information on at least one DL CC (DL Cell) via Primary CC (PCC or PCell).

For instance, the user equipment may be able to receive the CSI feedback configuration informations on all DL Cells including PCell via the PCell. Moreover, the user equipment receives the CSI feedback configuration informations on PCell and inactive SCells via the PCell and may be able to receive the CSI feedback configuration information on active SCell via each SCell.

In doing so, in order to indicate that the CSI feedback configuration information relates to a prescribed DL CC, a DL CC index (e.g., a physical or logical index, 3-bit CIF, etc.) may be received as well. Having received the CSI feedback configuration information transmitted by the higher layer signaling, the user equipment may be able to transmit a CSI feedback in accordance with the received CSI feedback configuration information.

If the user equipment receives the CSI feedback configuration informations on all the DL CCs via the DL PCC without DL CC indexes, it may be difficult for the user equipment to recognize that the received information relates to which DL CC. Moreover, since the DL PCell and the DL SCells may differ from each other in bandwidth, a subband size k or a bandwidth part J, which is variable depending on a bandwidth, may become unclear.

The CSI feedback may be required for the configured and inactive SCells as well as for the configured and active SCells. Hence, the CSI feedback for the inactive SCells may be necessary. Since the user equipment does not perform monitoring on the inactive SCells, it is unable to receive the CSI feedback configuration information via the corresponding SCell. Therefore, the CSI feedback configuration information on the inactive SCell may be received by higher layer signaling via PCell with CC index.

When the user equipment receives the CSI feedback configuration informations on all the DL CCs via PCell, the CSI feedback configuration information on the PCell uses the type of 3GPP LTE Rel-8 and the CSI feedback configuration informations on the rest of the SCells may be received as a delta type of PCell information.

According to a $3^{rd}$ embodiment of receiving the CSI feedback configuration information, the user equipment may be able to receive CSI feedback configuration information on at least one DL CC (DL Cell) via random DL CC (DL Cell).

In this case, an IE for the CSI feedback configuration information can be put in a configuration IE (information element) of the DL CC. In particular, as mentioned in the foregoing description of the $2^{nd}$ embodiment, since a DL CC index is included, the user equipment is able to know that the CSI feedback configuration information corresponds to which DL Cell.

When the CSI feedback configuration informations on the at least or more DL Cells are received on the random DL Cell, the CSI feedback configuration information on PCell or self-scheduling CC uses the type of 3GPP LTE Rel-8 as it is and the CSI feedback configuration informations on the rest of the DL Cells can be received as the delta type thereof.

The user equipment is able to save and manage the received CSI feedback configuration informations.

The user equipment may be able to measure the CSI of each of the CCs for the CSI feedback [S130]. The user equipment processes the information on the measured CSI in accordance with the CSI feedback configuration information.

In doing so, it may happen that the user equipment should feed back CSIs of a plurality of CCs (Cells) in the same frame at the same time [S140].

In this case, the user equipment may be able to drop a prescribed information in accordance with a CSI feedback priority [S150]. In particular, the CSI feedback priority may be received separately or in a manner of being contained in the corresponding CSI feedback priority.

According to a $1^{st}$ embodiment of the CSI feedback priority, the CSI feedback priority may be set for each of RI, PMI and CQI.

For instance, the priority may be set to 'RI>PMI=CQI'. In this case, if a transmission of CQI and/or PMI for DL SCell #0 and a transmission of RI for DL SCell #1 occur in the same subframe, the transmission of the CQI and/or PMI having a relatively low priority can be dropped.

According to a $2^{nd}$ embodiment of the CSI feedback priority, the CSI feedback priority may be set for each of DL CCs.

For instance, a priority of a feedback for DL PCell may be set higher. In particular, when a feedback of CQI, PMI or RI for the DL PCell, a feedback of CQI, PMI or RI for SCell #1 and a feedback of CQI, PMI or RI for SCell #2 occur in the same subframe, the feedback for the PCell having a relatively higher priority is transmitted only but the feedbacks for SCell #1 and SCell #2 can be dropped.

In case that the feedback for PCell is not transmitted, the feedbacks can be performed by the priority relation previously designated among SCells. For instance, in case that the feedback for the cell having a lowest (or highest) physical/logical index has a highest priority, the feedback for the corresponding Cell can be transmitted. In particular, in case that the feedback for SCell #1 and the feedback for SCell #2 collide with each other, the feedback for the SCell #1 having a lowest index is transmitted only but the feedback for the SCell #2 can be dropped. If the user equipment receives the priorities of 'PCell>SCell #2>SCell #1>SCell #0', the user equipment may be able to drop the feedbacks by the received priorities.

For a modified example of the $2^{nd}$ embodiment, the priority may be set in association with a QoS (quality of service) set up per DL Cell. In particular, a DL Cell having a relatively high QoS may have a high priority of a CSI feedback. Such QoS can be received by the user equipment as well.

According to a $3^{rd}$ embodiment of the CSI feedback priority, the CSI feedback priority may be set up in accordance with a count of dropping the feedback.

For instance, if the drop counts of DL SCell #1 and DL SCell #2 are 'a' and 'b' at a prescribed point, respectively, it may be able to drop a feedback for the DL SCell having the drop count bigger (or smaller) that that of the other.

According to a $4^{th}$ embodiment of the CSI feedback priority, a priority of a wideband (WB) CQI feedback may be higher than that of a subband (SB) CQI feedback. In particular, when a subband feedback in DL PCell and a broadband feedback in DL SCell #2 occur in the same subframe, the CSI for the SCell #2 is fed back and the CSI feedback for the DL PCell can be dropped.

According to a $5^{th}$ embodiment of the CSI feedback priority, a CSI feedback for a DL Cell having a short transmission period (i.e., a large transmission frequency number) may be able to have a high priority. If the transmission period is short, it may mean that a carrier aggregation system regards a corresponding DL Cell as important. Therefore, a priority of a CSI feedback for the corresponding cell can be set higher.

According to a modified example of the $5^{th}$ embodiment, a CSI feedback for a DL Cell having a long transmission period (i.e., a small transmission frequency number) may be able to have a high priority. If the transmission period is long, it may mean that there is a small change to receive a CSI feedback. If the corresponding CSI is dropped, it may further lose a feedback opportunity. Therefore, a priority of a CSI feedback for a DL Cell having a long transmission period can be set higher.

According to a $6^{th}$ embodiment of the CSI feedback priority, the priority can be set in accordance with a type (e.g., self-scheduling, cross-scheduling, etc.) of CC scheduling.

For instance, a CSI feedback for self-scheduling CC (e.g., self-scheduling PCell, self-scheduling SCell) may have a priority set higher than that of a CSI feedback for cross-scheduling CC (e.g., cross-scheduling SCell). In particular, when CSI feedback collision occurs, a CSI feedback for self-scheduling CC is transmitted but a CSI feedback for cross-scheduling CC can be dropped.

According to a modified example of the $6^{th}$ embodiment, a CSI feedback for cross-scheduling CC may have a priority set higher than that of a CSI feedback for self-scheduling CC. In particular, when CSI feedback collision occurs, a CSI feedback for cross-scheduling CC is transmitted but a CSI feedback for self-scheduling CC can be dropped.

The above-mentioned priorities can be used independently or together. For instance, both of the RI priority and the PCell priority can be used simultaneously. In particular, a top priority is set for the RI of PCell and next priorities are set for the RIs of SCells, the CQI/PMI of the PCell, and the CQI/PMI of the SCells in order. This combination of the priorities may be received in a manner of being included in the CSI feedback configuration information or may be received separately from the CSI feedback configuration information.

In case that the user equipment needs to simultaneously feed back CSIs for multiple CCs (Cells) in the same subframe, the user equipment may perform joint coding on the corresponding CSIs by a modified example of the user equipment operating method.

For instance, when a CSI for DL PCell and a CSI for DL SCell #1 should be transmitted in the same subframe, the corresponding CSIs can be transmitted in a manner of being joint coded. If a total information bit size to be joint coded exceeds 11 or 13 bits receivable by PUCCH format 2, it can be transmitted using MSM or DFT-S-OFDM based structure. In doing so, since a fore part of an information bit stream has a higher reliability due to the properties of RM (Reed-Muller) coding, a CSI for DL PCell can be situated at the fore part (or, a CSI for DL Cell having a high priority can be situated at the fore part).

Since it may be preferable not to drop the RI in the CSI, RI may be joint coded only (but CQI and PMI are dropped). Since RI occupies maximum 2 bits per CC, total 10 bits need to be joint coded for 5 DL CCs and this size is receivable by PUCCH format 2. In doing so, since a fore part of an information bit stream has a higher reliability due to the properties of RM coding, RI for DL PCell can be situated at the fore part.

The user equipment transmits the CSI feedback created by the dropping to the base station [S160]. Alternatively, the user equipment may transmit the CSI feedback created by the joint coding to the base station.

Figure 12:
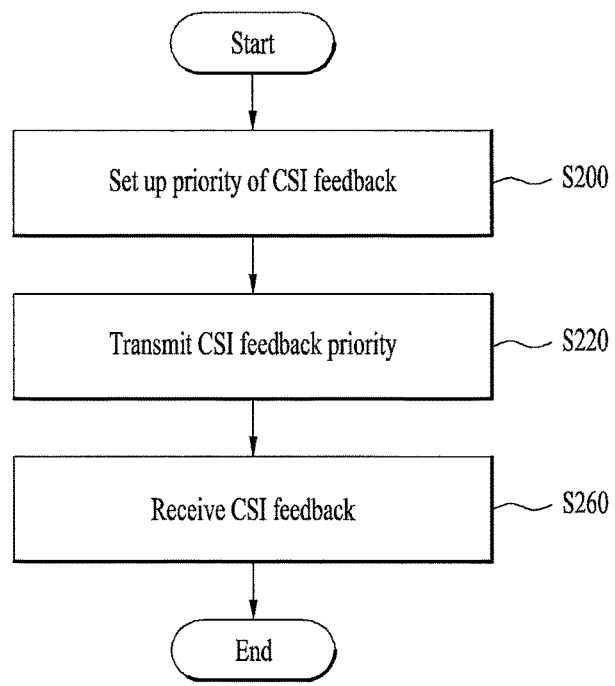
FIG. 12 is a flowchart of a method for a base station to receive CSI feedback in a carrier aggregation system according to one embodiment of the present invention.

FIG. 12 is a flowchart of a method for a base station to receive CSI feedback in a carrier aggregation system according to one embodiment of the present invention.

Referring to FIG. 12, a base station may be able to set up a priority of a CSI feedback [S200]. In case that the user equipment need to simultaneously transmit CSIs for a plurality of component carriers (CCs or Cells) in the same subframe, the priority is the information that is considered for the user equipment to drop prescribed information in the CSI feedback. Various embodiments of the CSI feedback priority are as good as mentioned in the foregoing description.

The base station is able to set up, change and manage the priority.

The base station is able to transmit the CSI feedback configuration information and the CSI feedback priority to the user equipment [S220]. In this case, the CSI feedback configuration information is the information necessary for the user equipment to transmit the CSI feedback and may include such information as feedback CC, feedback frame structure and the like, and more particularly, a priority of the CSI feedback.

The base station may be able to transmit the CSI feedback configuration information and the CSI feedback priority by RRC (radio resource control) signaling. And, the base station may be able to transmit the priority together with at least one control information at a timing point of transmitting a specific control information.

Embodiments of transmitting the CSI feedback configuration information are as good as mentioned in the foregoing description.

Having received the CSI feedback configuration information, the user equipment measures a CSI for each CC and is then able to feed back the measured CSI to the base station.

In case that CSI feedback collision occurs, the user equipment drops prescribed information by the CSI feedback priorities and then transmits the remaining feedbacks to the base station. Alternatively, as mentioned in the foregoing description, the user equipment performs joint coding on the CSI feedbacks and then transmits the joint coded feedbacks to the base station.

Finally, the base station is able to receive the CSI feedback transmitted by the user equipment [S260].

The embodiments and modified examples thereof mentioned in the foregoing description can be combined with one another. The embodiments can be implemented in a manner of being combined with one another rather than separately implemented if necessary. Since such combination can be easily implemented by those skilled in the art, its details shall not be further described. Yet, even if the combinations are not described, they shall not be excluded from the present invention and should be construed as coming within the scope of the appended claims and their equivalents.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

For instance, a method according to the present invention may be saved in a storage medium (e.g., a built-in memory, a flash memory, a hard disc, etc.) and may be implemented into codes and/or commands in a software program executable by a processor (e.g., a microprocessor, etc.).

Figure 13:
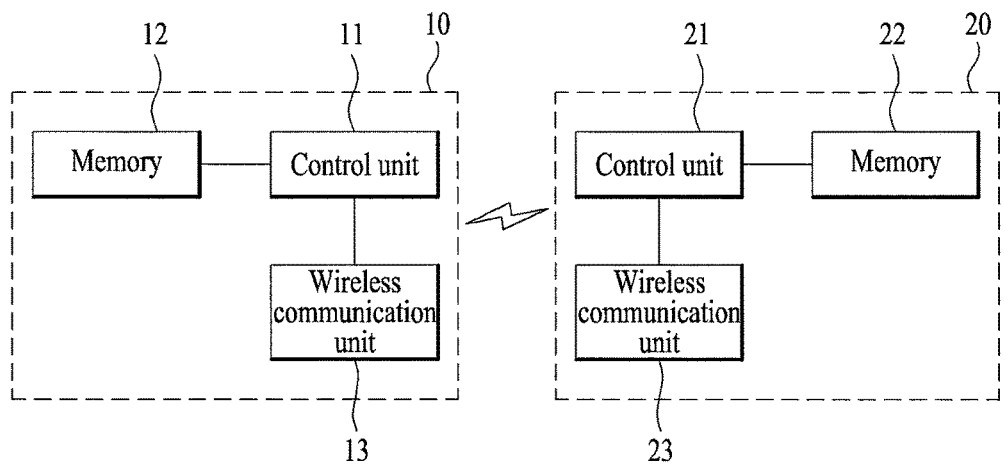
FIG. 13 is a block diagram of a user equipment and a base station according to one embodiment of the present invention.

FIG. 13 is a block diagram of a user equipment and a base station according to one embodiment of the present invention.

Referring to FIG. 13, a user equipment 10 includes a control unit 11, a memory 12 and a wireless communication unit 13.

And, the user equipment 10 includes a display unit, a user interface unit and the like.

The control unit 11 implements a proposed function, process and/or method. Protocol layers of the radio interface protocol can be implemented by the control unit 11.

The control unit 11 controls the wireless communication unit to receive CSI (channel state information) feedback configuration information on each of a plurality of DL CCs from a base station. And, the control unit 11 may control the wireless communication unit to receive priority information configured in accordance with the CSI or DL CC from the base station.

Based on the received CSI feedback configuration information, the control unit 11 is able to control the wireless communication unit to feed back the CSI on PUCCH of UL Primary CC.

In case that CSIs for a plurality of the DL CCs need to be simultaneously fed back to the base station, the control unit 11 is able to control one CSI, which is to be fed back to the base station, to be determined based on the received priority information. And, the control unit 11 is able to control the one CSI to be determined in a manner of dropping CSIs of the rest of the DL CCs except the CSI for the DL CC having a top priority.

The memory 12 is connected to the control unit 11 and stores a protocol or parameters for performing the wireless communication. In particular, the memory 12 stores user equipment operating systems, applications and general files.

The wireless communication unit 13 is connected to the control unit 11 and transmits and/or receives wireless signals.

In addition, the display unit displays various kinds of informations of the user equipment and may include such a well-known component as LCD (liquid crystal display), OLED (organic light emitting diodes) and the like. The user interface unit may include a combination of such a well-known user interface as a keypad, a touchscreen and the like.

The base station 20 includes a control unit 21, a memory 22 and a wireless communication (radio frequency: RF) unit 23.

The control unit 21 implements a proposed function, process and/or method. Protocol layers of a radio interface protocol can be implemented by the control unit 21.

The control unit 21 is able to configure the CSI feedback configuration information and the CSI feedback priority. And, the control unit 21 is able to change and manage the priority. The control unit 21 controls the wireless communication unit 23 to transmit the CSI feedback configuration information and the CSI feedback priority to the user equipment.

The control unit 21 controls the wireless communication unit 23 to receive the CSI feedback transmitted by the user equipment.

The memory 22 is connected to the control unit 21 and stores protocols and/or parameters for performing the wireless communication.

The wireless communication unit 23 is connected to the control unit 21 and transmits and/or receives wireless signals.

The control unit 11/21 may include ASIC (application-specific integrated circuit), other chipsets, logical circuits and/or data processors. The memory 12/22 may include ROM (read-only memory), RAM (random access memory), flash memory, memory cards, storage medium and/or other storage devices. The wireless communication unit 13/23 may include a baseband circuit configured to process wireless signals. When the embodiment of the present invention is implemented by software, the above-mentioned schemes can be implemented with modules (e.g., processes, functionalities, etc.) configured to perform the above-mentioned functionalities. The modules are saved in the memory 12/22 and can be activated by the control unit 11/21.

The memory 12/22 may be built in or out of the control unit 11/21 and may be connected to the control unit 11/21 via various well-known means.

The various embodiments described so far can be implemented in a recording medium, which can be read by a computer or a device similar to the computer, using software, hardware or combination thereof.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this case, the base station is meaningful as a terminal node of a network that directly communicates with the terminal. In this disclosure, a specific operation explained as performed by a base station can be performed by an upper node of the base station in some cases.

In this case, 'base station' can be replaced by such a terminology as a fixed station, a Node B, an eNode B (eNB), an access point (AP) and the like. And, 'terminal' of the present invention can be replaced by such a terminology as a user equipment (UE), a mobile station (MS), a subscriber station (SS), a mobile subscriber station (MSS) and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of receiving a channel state information (CSI) report by a base station in a wireless communication system, the method comprising:
    transmitting, to a user equipment (UE) via radio resource control (RRC) signaling, information for configuring at least one secondary cell (SCell) in addition to a primary cell (PCell) and a plurality of periodic CSI feedback configurations for a plurality of serving cells including the SCell and the PCell; and
    receiving, from the UE via a subframe of the PCell, a CSI report for only one of the plurality of serving cells,
    wherein when CSI reports of two or more serving cells of the plurality of serving cells collide with each other in the subframe, one or more CSI reports having lower priorities are dropped, and
    wherein when CSI reports of different serving cells having a same priority collide with each other in the subframe, CSI reports of one or more serving cells other than one serving cell having a lowest cell index are dropped.

2. The method of claim 1, wherein the CSI report is received via a physical uplink control channel (PUCCH) included in the subframe of the PCell.

3. The method of claim 1, wherein the CSI report includes at least one of a channel quality indicator (CQI), a precoding matrix indicator (PMI) and a rank indicator (RI).

4. The method of claim 3, wherein a CSI report including the CQI has a lower priority than a CSI report including the RI.

5. The method of claim 1, wherein the information for configuring the SCell is received via a RRC connection reconfiguration message.

6. A method of transmitting a channel state information (CSI) report by a user equipment (UE) in a wireless communication system, the method comprising:
receiving, from a base station (BS) via radio resource control (RRC) signaling, information for configuring at least one secondary cell (SCell) in addition to a primary cell (PCell) and a plurality of periodic CSI feedback configurations for a plurality of serving cells including the SCell and the PCell; and
transmitting, to the BS via a subframe of the PCell, a CSI report for only one of the plurality of serving cells,
wherein when CSI reports of two or more serving cells of the plurality of serving cells collide with each other in the subframe, one or more CSI reports having lower priorities are dropped, and
wherein when CSI reports of different serving cells having a same priority collide with each other in the subframe, CSI reports of one or more serving cells other than one serving cell having a lowest cell index are dropped.

7. The method of claim 6, wherein the CSI report is transmitted via a physical uplink control channel (PUCCH) included in the subframe of the PCell.

8. The method of claim 6, wherein the CSI report includes at least one of a channel quality indicator (CQI), a precoding matrix indicator (PMI) and a rank indicator (RI).

9. The method of claim 8, wherein a CSI report including the CQI has a lower priority than a CSI report including the RI.

10. The method of claim 6, wherein the information for configuring the SCell is received via a RRC connection reconfiguration message.

11. A base station (BS) comprising:
a transmitter configured to transmit, to a user equipment (UE) via radio resource control (RRC) signaling, information for configuring at least one secondary cell (SCell) in addition to a primary cell (PCell) and a plurality of periodic channel state information (CSI) feedback configurations for a plurality of serving cells including the SCell and the PCell;
a receiver configured to receive, from the UE via a subframe of the PCell, a CSI report for only one of the plurality of serving cells; and
a processor configured to control the transmitter and the receiver,
wherein when CSI reports of two or more serving cells of the plurality of serving cells collide with each other in the subframe, one or more CSI reports having lower priorities are dropped, and
wherein when CSI reports of different serving cells having a same priority collide with each other in the subframe, CSI reports of one or more serving cells other than one serving cell having a lowest cell index are dropped.

12. The BS of claim 11, wherein the CSI report is received via a physical uplink control channel (PUCCH) included in the subframe of the PCell.

13. The BS of claim 11, wherein the CSI report includes at least one of a channel quality indicator (CQI), a precoding matrix indicator (PMI) and a rank indicator (RI).

14. The BS of claim 13, wherein a CSI report including the CQI has a lower priority than a CSI report including the RI.

15. The BS of claim 11, wherein the information for configuring the SCell is received via a RRC connection reconfiguration message.

16. A user equipment (UE) comprising:
a receiver configured to receive, from a base station (BS) via radio resource control (RRC) signaling, information for configuring at least one secondary cell (SCell) in addition to a primary cell (PCell) and a plurality of periodic channel state information (CSI) feedback configurations for a plurality of serving cells including the SCell and the PCell;
a transmitter configured to transmit, to the BS via a subframe of the PCell, a CSI report for only one of the plurality of serving cells; and
a processor configured to control the receiver and the processor,
wherein when CSI reports of two or more serving cells of the plurality of serving cells collide with each other in the subframe, one or more CSI reports having lower priorities are dropped, and
wherein when CSI reports of different serving cells having a same priority collide with each other in the subframe, CSI reports of one or more serving cells other than one serving cell having a lowest cell index are dropped.

17. The UE of claim 16, wherein the CSI report is transmitted via a physical uplink control channel (PUCCH) included in the subframe of the PCell.

18. The UE of claim 16, wherein the CSI report includes at least one of a channel quality indicator (CQI), a precoding matrix indicator (PMI) and a rank indicator (RI).

19. The UE of claim 18, wherein a CSI report including the CQI has a lower priority than a CSI report including the RI.

20. The UE of claim 16, wherein the information for configuring the SCell is received via a RRC connection reconfiguration message.

* * * * *